(12) United States Patent (10) Patent No.: US 8,712,383 B1
Hayes et al. (45) Date of Patent: Apr. 29, 2014

(54) TACTILE OUTPUT DEVICE FOR COMPUTING DEVICE NOTIFICATIONS

(75) Inventors: Barry Hayes, Palo Alto, CA (US); Peter Dolan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 57 days.

(21) Appl. No.: 13/529,704

(22) Filed: Jun. 21, 2012

(51) Int. Cl.
*H04M 3/42* (2006.01)
*H04L 29/08* (2006.01)

(52) U.S. Cl.
USPC .................. 455/412.2; 455/404.1; 455/414.4; 455/556.1

(58) Field of Classification Search
USPC .......................... 455/412, 404.1, 414.4, 556.1
See application file for complete search history.

(56) References Cited

U.S. PATENT DOCUMENTS

| | | | |
|---|---|---|---|
| 6,650,746 B1* | 11/2003 | Groen et al. ............. | 379/207.16 |
| 7,257,200 B2* | 8/2007 | Valeriano et al. .......... | 379/88.12 |
| 8,116,826 B2* | 2/2012 | Kraft et al. .................... | 455/567 |
| 2007/0105533 A1* | 5/2007 | Chiu et al. ................. | 455/412.2 |
| 2007/0210908 A1* | 9/2007 | Putterman et al. ............ | 340/506 |
| 2008/0167006 A1* | 7/2008 | Hsi ............................. | 455/412.2 |
| 2012/0108215 A1* | 5/2012 | Kameli ...................... | 455/412.2 |

* cited by examiner

*Primary Examiner* — Qun Shen
(74) *Attorney, Agent, or Firm* — Shumaker & Sieffert, P.A.

(57) ABSTRACT

In general, this disclosure describes techniques for providing a user with an alert device that provides alert options indicatives of events associated with applications or actions of a computing device. The provided alert options may be such that they do not create additional distractions, and eliminate the need for the user to have to constantly check for upcoming appointments or events. Specifically, a user can utilize a device to receive alerts from an associated computing device. The alerts may be associated with applications and actions running on the computing device.

21 Claims, 5 Drawing Sheets

TACTILE OUTPUT DEVICE FOR COMPUTING DEVICE NOTIFICATIONS

TECHNICAL FIELD

The disclosure relates to notifications associated with computing devices.

BACKGROUND

Computing devices often allow users to set up alerts associated with certain events. Often the reminders are audible, or in some cases distracting and noticeable. The user may at times wish to not be distracted or cause a distraction, and may thus be forced to turn off audible notifications. User may either miss an important notification or constantly check his or her computing device to see if an important event is coming up, thus causing additional distractions.

SUMMARY

In general, this disclosure describes techniques for providing a user with an alert device that provides alert options indicative of events associated with applications or actions of a computing device. The provided alert options may be such that they do not create additional distractions, and eliminate the need for the user to have to constantly check for upcoming appointments or events (e.g., calls, messages, e-mails, or the like). According to these techniques, a user can utilize a device (e.g., a tactile device) to receive alerts from an associated computing device (e.g., mobile phone, remote computer, or the like). The alerts may be associated with applications and actions (e.g., calendar events and reminders, e-mail, and the like) running on the computing device. According to these techniques, a computing device running an application or action may communicate an alert corresponding to an event associated with the application or action to an alert device, where the alert indicates to the user the occurrence of the event. The alerts may be set up in advance on the computing device, and the alert device may be associated with the computing device to receive a signal to output the appropriate alert.

In one example, the disclosure is directed to a method comprising receiving, by an alert device, a notification signal communicated by a computing device, wherein the notification signal is indicative of an event, and wherein the alert device is communicatively coupled with the computing device, responsive to receiving the notification signal, selecting, by the alert device, a tactile signal from a plurality of tactile signals based on the notification signal, wherein the tactile signal differs in at least one of intensity and pattern from another tactile signal in the plurality of tactile signals, and outputting the tactile signal indicative of the received notification and detectable by a user of the computing device.

In another example, the disclosure is directed to a device comprising one or more processors, a communication interface operable by the one or more processors to receive a notification signal communicated by a computing device, wherein the notification signal is indicative of an event, and wherein the device is communicatively coupled with the computing device, and wherein the one or more processors is configured to, responsive to receiving the notification signal, select a tactile signal out of a plurality of tactile signals based at least in part on the event and to output the tactile signal indicative of the received notification and detectable by a user of the computing device, wherein the tactile signal differs in at least one of intensity and pattern from another tactile signal in the plurality of tactile signals.

In another example, the disclosure is direction to a computer-readable storage medium, in a device, encoded with instructions that, when executed, cause one or more processors to perform operations comprising receiving a notification signal communicated by a computing device, wherein the notification signal is indicative of an event, and wherein the device is communicatively coupled with the computing device, responsive to receiving a notification signal, selecting a tactile signal out of a plurality of tactile signals based at least in part on the event, wherein the tactile signal differs in at least one of intensity and pattern from another tactile signal in the plurality of tactile signals, and outputting the tactile signal indicative of the received notification and detectable by a user of the computing device.

The details of one or more examples are set forth in the accompanying drawings and the description below. Other features, objects, and advantages will be apparent from the description and drawings, and from the claims.

DETAILED DESCRIPTION

Figure 1A:
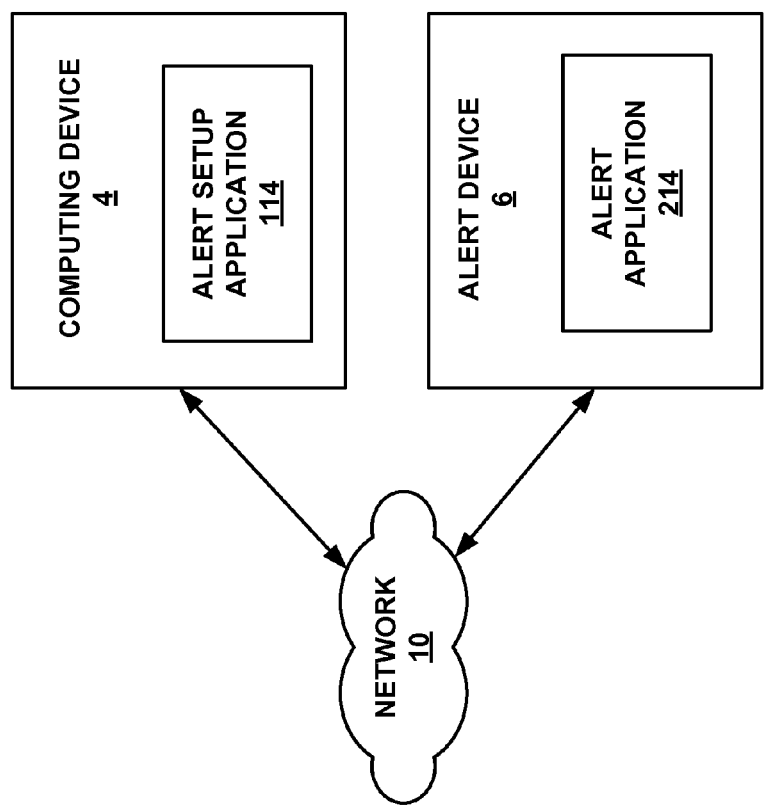
FIG. 1A is a block diagram illustrating an example system according to some aspects of the disclosure.

Computing devices, such as mobile devices, often provide users with the convenience of alerting their users to events in applications, e.g., reminders of upcoming appointments, newly received e-mails or voicemails/text messages, and the like. For example, when setting up an appointment in a calendar, a user may request a reminder at some time interval before the appointment, e.g., 30 minutes, 1 day, and so forth. Often, the reminders and alerts are audible or noticeable and therefore distracting. However, in certain situations, a user may wish to turn off the audio alert (e.g., during a meeting, in the movies, and so forth). The user may still wish to know when and if he/she receives a new message or has an upcoming appointment. What users frequently do, when distracting alerts are turned off, is to check their mobile devices to see if they have an upcoming appointment or a missed call/message/e-mail. This can cause additional distractions.

In general, this disclosure describes techniques for providing a user with an alert device that provides alert options indicative of events associated with applications or actions of a computing device. The provided alert options may be such that they do not create additional distractions, and eliminate the need for the user to have to constantly check for upcoming appointments or events (e.g., calls, messages, e-mails, or the like). According to these techniques, a user can utilize a device (e.g., a tactile device) to receive alerts from an associated computing device (e.g., mobile phone, remote computer, or the like). The alerts may be associated with applications and actions (e.g., calendar events and reminders, e-mail, and the like) running on the computing device. According to these techniques, a computing device running an application or action may communicate an alert corresponding to an event associated with the application or action to an alert device, where the alert indicates to the user the occurrence of the event. The alerts may be set up in advance on the computing device, and the alert device may be associated with the computing device to receive a signal to output the appropriate alert.

The techniques of this disclosure provide a user with the ability to receive alerts from an alert device indicative of events corresponding to applications or actions running on a computing device. The user may associate the alert device with the computing device, such that alerts corresponding to applications running on the computing device may be output by the alert device. When the user wishes to turn off distracting alerts of the computing device, the alert device may be enabled, such that when an alert comes up on the computing device, the alert device may output a corresponding alert. The user may set a different alert for each application or event. The alerts may be inaudible, for example, pressure, vibrations, or the like. In one example, the alert may be a subtle and gentle signal (e.g., pressure) applied by the alert device such that the alert may not be noticeable by itself, but the user may notice the transition and/or the explicit focus brought by the application of the signal.

In one example, as noted above, the user of a computing device may set an alert for one or more applications running on a computing device (e.g., reminders, timers, or the like) or may enable alerts for applications (e.g., email, text message, or voicemail notifications, or the like). The user may also associate an alert device with the computing device, such that when alerts occur on the computing device, the alert device receives a signal indicating an alert, which the alert device may then output according to the settings selected by the user.

In one example, the user may utilize the computing device to indicate switching to an alert mode that utilizes the alert device, e.g., select in settings the alert device. In another example, the computing device may switch automatically to an alert mode that utilizes the alert device when certain settings are detected, e.g., selection of "silent" or "tactile" mode.

In one example, the user may set up a calendar appointment or event, and set an alert, where the alert may serve as an appointment reminder for the user. The alert may be set for a time interval leading up to the appointment, for example, 30 minutes before the appointment time. When it is time for the alert, e.g., 30 minutes before the appointment time, and while the computing device is set to utilize the alert device for outputting alerts, the user may receive a tactile alert.

In other examples, the tactile alert may be used to act as a notification to alert the user that there are unread emails in the user's inbox, or text messages, or to indicate an incoming phone call. In this manner, the user may not need to look at his/her device or the different applications to determine whether something is coming up or an event has occurred.

According to techniques of this disclosure, the tactile alerts may be output by the alert device, which may be a stand-alone object or incorporated into another device. For example, the alert device may be a dedicated wristband. In another example, the alert device may be incorporated into a watch, a bracelet, jewelry, a trinket, a charm, or another existing object that the user wears or utilizes. As noted above, the alert device may be associated with the user's computing device, such that when an alert comes up on a computing device application, the computing device communicates a signal to the alert device, which provides some form of tactile feedback (e.g., pressure, vibration, and the like).

In some examples, the tactile alert may be variable, and may depend on the associated application. For example, a tactile alert associated with a calendar event may be different from a tactile alert associated with an incoming call. In some examples, the tactile alert may also vary according to urgency, such as the time remaining until the occurrence of the event. For example, a tactile alert associated with a reminder 30 minutes prior to a calendar event may be different (e.g., a more intense tactile alert) from a tactile alert associated with a reminder that is one day prior to an event. The variations in the tactile alerts may be customizable by the user. For example, the user may assign different tactile alerts (e.g., intensity, pattern, etc.) to different contacts in user's phone book, such that the use can without looking determine a group of contacts associated with the tactile alert.

In one example, the alert device may be a wrist band, and may have a plate that presses into the user's wrist to alert the user to events associated with user's mobile phone. The amount of pressure may indicate the urgency of an event or the type of event. For example, alerts for incoming phone calls may cause stronger pressure to be exerted by the alert device than alerts for a text message. In another example, the tactile alert may be a vibration, and different vibration patterns and/or intensity may be used to indicate the type of associated event and/or urgency. In one example, the alert device may comprise passive pressure plates, which may provide alerts in the form of passive pressure.

The computing device and the alert device may communicate in one of several ways. For example, the communication may be achieved over a Bluetooth® connection. In other examples, the alert device may be built into or may include a data connection capable of communicating with the computing device over a data transmission scheme (e.g., WiFi). In some examples, the computing device may communicate directly with the alert device or through a remote device.

FIG. 1 is a block diagram illustrating an example system 2 in accordance with one or more aspects of this disclosure. As illustrated in FIG. 1, communication system 2 may include computing device 4, alert device 6, and network 10. In one example, alert device 6 may be a stand-alone device or object or may be incorporated into another device or object. Computing device 4 may include alert setup application 114, and alert device 6 may include alert application 214, the operation of each of which will be described in more detail below. Computing device 4 and alert device 6 may be separate objects, so that, for example, alert device 6 is not incorporated into computing device 4.

In some examples, computing device 4 may comprise, but is not limited to, a mobile device. For example, computing device 4 may comprise or be part of a wireless communication device (e.g., wireless mobile handset or device), a video telephone, a digital multimedia player, a personal digital assistant (PDA), a video game console, a laptop computer, a tablet computer, or other devices. For purposes of illustration only, computing devices 4 may at times be described in this disclosure as a mobile device or mobile phone device, but aspects of this disclosure should not be considered limited to mobile phone devices.

As noted above, alert device 6 may be a stand-alone object or may be part of another device. In one example, alert device 6 may be a wrist band or a device that is in direct contact with the user, and may have a portion, e.g., an outer surface, which may be in contact with the user's skin and may utilize some type of tactile signaling (e.g., pressure, vibration, haptic feedback, and the like) to alert the user with events associated with computing device 4. In other examples, alert device 6 is not worn by or in direct contact with the user. For example, alert device 6 may be a charm attached to the user's purse or bag, or may be a device that the user may leave on a table that the user is using. In some examples, alert device 6 may be built into another device. For example, alert device 6 may be built into a wrist watch, or may be built into the steering wheel or the driver's seat of an automotive vehicle, so that alert device 6 may provide haptic feedback to the user regarding events associated with computing device 4 while the user is driving. Variations of the tactile signal may be utilized to indicate different types of alerts or events. The variation may depend on the urgency of an event or on the type of event. In some examples, alert device 6 may not provide a visual indication of alerts of events associated with computing device 4. In some examples, alert device 6 may not include a display (e.g., a screen) for providing visual indication of alerts of events associated with computing device 4.

In one example, computing device 4 and alert device 6 may include Wi-Fi, Bluetooth, or other wireless communication capabilities, and may be configured to communicate over a network 10. Computing device 4 and alert device 6 may utilize network 10 to communicate with each other and other devices. For example, computing device 4 may communicate a signal to alert device 6 indicating occurrence of an event, and alert device may as a result output an alert to the user.

In one example, the user of computing device 4 may associate computing device 4 with alert device 6, such that alerts associated with applications running on computing device 4 are output by alert device 6. In one example, computing device 4 and alert device 6 may be associated using one of several methods such as, for example, using Bluetooth pairing, configuring their IP addresses, using near-field communication to configure the connection, printing a QR-code printed for one device with the device information and read by the other device to set up the connection, and so forth. For example, using the Bluetooth pairing, each of computing device 4 and alert device 6 may go into a discovery mode, then each of the devices may transmit a secret key between them and provide the user with a request to verify that both devices have the same secret key, or the verification may be performed automatically.

In one example, the alerts associated with applications running on computing device 4 may be set up by the user, e.g., event reminders in calendar application, timers, alarm clock, and the like. In another example, the alerts may be associated with normal operation of certain applications, e.g., incoming call, text message, voicemail, or the like. In some examples, the alerts may be set up through a separate application associated with alert setup application 114, or may be set up within the applications themselves. For example, alerts for the calendar may be set up from alert setup application 114 or alerts may be generally enabled through alert setup application 114 and specific alerts set up within the corresponding applications (e.g., calendar). In another example, a user may turn on a silent mode for computing device 4, which may automatically turn on an alert mode that forwards alerts from computing device 4 to alert device 6.

In one example, computing device 4 and alert device 6 may communicate directly through network 10, such as via peer-to-peer communication (e.g., via Bluetooth). In another example, computing device 4 and alert device 6 may communicate through a server. In this example, requests and information communicated by either device may be communicated to a server and retrieved from the server. The following discussion describes the techniques of the disclosure using the example where computing devices communicate directly through network 10, but it should be understood that the techniques may be implemented such that the computing devices communicate through a central server.

In one example, computing device 4 may have one or more applications running that usually provide some type of a notice or alert to the user associated with its operation. However, the user may wish to turn off alerts associated with computing device 4 as they may be distracting. In one example, when the user turns off the regular alerts on computing device 4, alerts may be automatically forwarded to alert device 6, upon enabling alert setup application 114. In another example, when the user turns off alerts on computing device 4, the user may also enable alert forwarding from alert setup application 114 or directly from the applications. In one example, alerts associated with all applications running on computing device 4 may be forwarded to alert device 6. In another example, the user may select which applications running on computing device 4 should forward alerts to alert device 6. In some examples, when the user sets computing device 4 to silent mode, alerts may be automatically forwarded to alert device 6.

In one example, during the operation of an application running computing device 4 an event may occur that may require an alert. During normal operation, computing device 4 may output an audible alert or an alert that is noticeable to the user, either audibly or visually. During a mode, where alerts may be turned off on computing device 4 or configured by the user to forward some or all alerts, alerts associated with applications running on computing device 4 may be forwarded to alert device 6. In one example, alert device 6 may output one type of alert for all alerts forwarded by computing device 4. In another example, alert device 6 may output alerts that vary from one application to another, and may also vary based on other criteria (e.g., urgency).

Alert device 6 may receive from computing device 4 a signal indicating an alert that is being forwarded. Alert device 6 may determine the type of corresponding output alert based on the signal. The type of output alert may depend on the configuration of alerts on computing device 4. In one example, alert device 6 may output the same type of alert for all received signals. In this example, the signal may simply indicate that an alert is required, and may be the same regardless of the associated application running on computing device 4. In another example, alert device 6 may output a different alert based on the received signal. In one example, the signal sent by computing device 4 may contain the type of alert to output (e.g., intensity, frequency, or the like). In another example, the signal sent by computing device 4 may contain information about the associated application and type of event or its urgency, and alert application 214 of alert device 6 may determine the type of alert to output based on the information in the received signal. Alert device 6 may then output the appropriate type of alert, which may controlled by alert application 214, which may control an alert output mechanism according to the type of alert. The alert output mechanism may be a portion of alert device 6 that is in contact with the user and may provide a mechanical or tactile output (e.g., vibration, haptic feedback, etc.) corresponding to the alert. In some examples, certain characteristics of the tactile output may relay certain information to the user. For example, a tactile output having a specific intensity level may be selected, so that more intense tactile output may indicate a more urgent matter having a higher level of importance (e.g., incoming phone call from an important contact, calendar event that is very soon, or the like). In another example, a tactile output having a specific pattern may be selected, so that the tactile pattern may indicate the type of associated application so that, for example, an alert associated with a phone application may have a different tactile pattern than an alert associated with a text messaging application. In one example, different types of tactile output and the corresponding characteristics may be set up by the user on computing device 4 or on alert device 6. In other examples, characteristics of the tactile output may indicate the identity of an originator of an incoming call to computing device 4, or the identity of a sender of a text message to computing device 4.

In some examples, the tactile output may vary in intensity based on the urgency of the alert. For example, the tactile output for an alert alerting the user to an event occurring in 24 hours may be less intense than the tactile output for an alert alerting the user to an event occurring in an hour, which in turn may be less intense than the tactile output for an alert alerting the user to an event occurring in 5 minutes. Alternatively, alerts may be associated with a level of importance (e.g., low importance, normal importance, and high importance), and tactile outputs for alerts associated with high importance may be more intense than tactile outputs for alerts associated with normal importance.

Figure 1B:
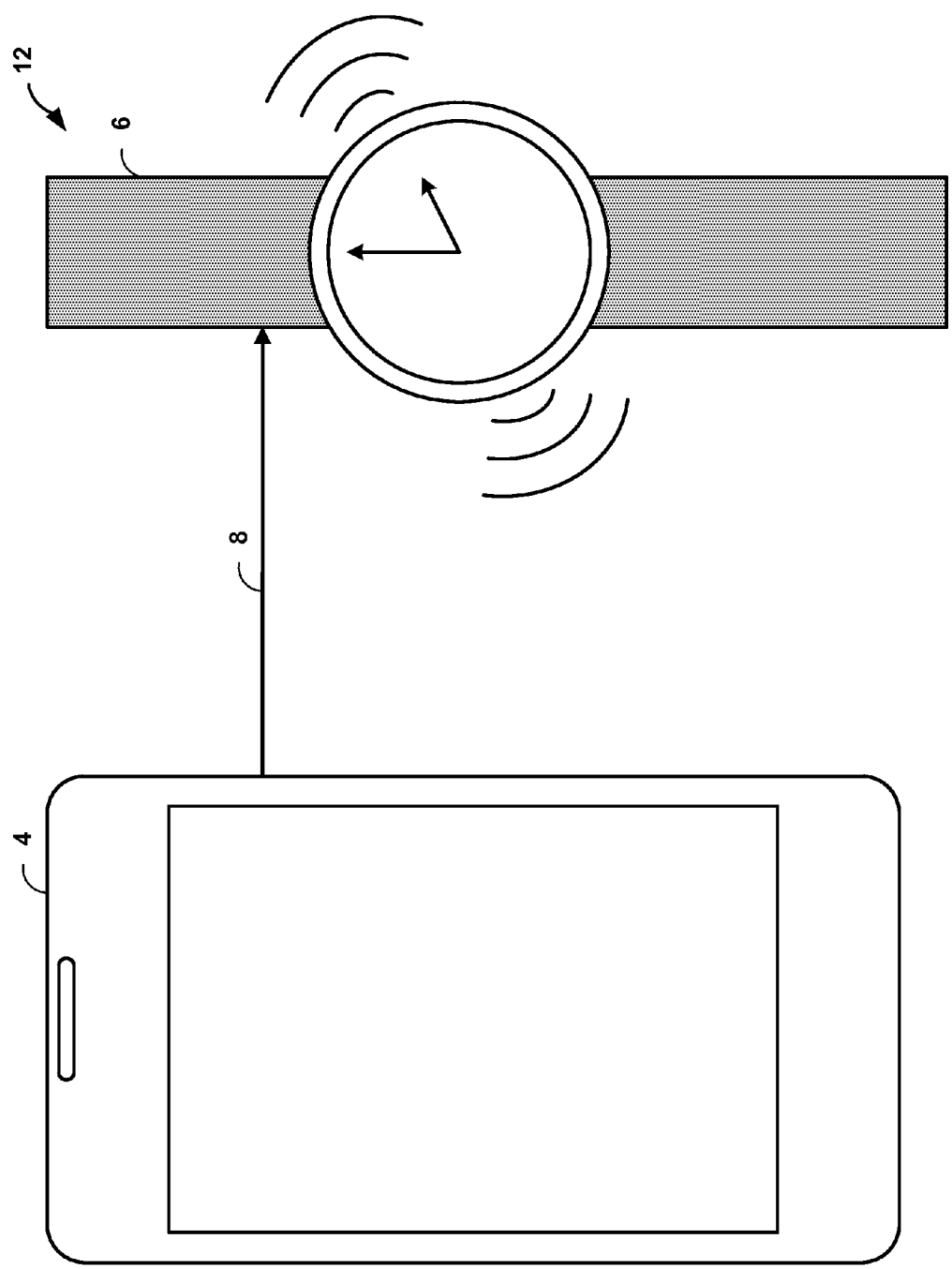
FIG. 1B is a graphical diagram illustrating an example computing device communicating with an example alert device according to some aspects of the disclosure.

FIG. 1B is a graphical diagram illustrating an example computing device 4 communicating with an example alert device 6. As shown in the specific example of FIG. 1B, computing device 4 may be a mobile computing device, such as a mobile phone, and alert device 6 may be a wristband of wristwatch 12. Computing device 4 may communicate alert 8 to alert device 6, and, in response to receiving alert 8, alert device 6 may output a tactile signal. For example, the tactile signal outputted by alert device 6 may be vibrations or other haptic feedback that may cause alert device 6 and/or wristwatch 12 to also vibrate and provide haptic feedback in response to receiving alert 8.

Figure 2A:
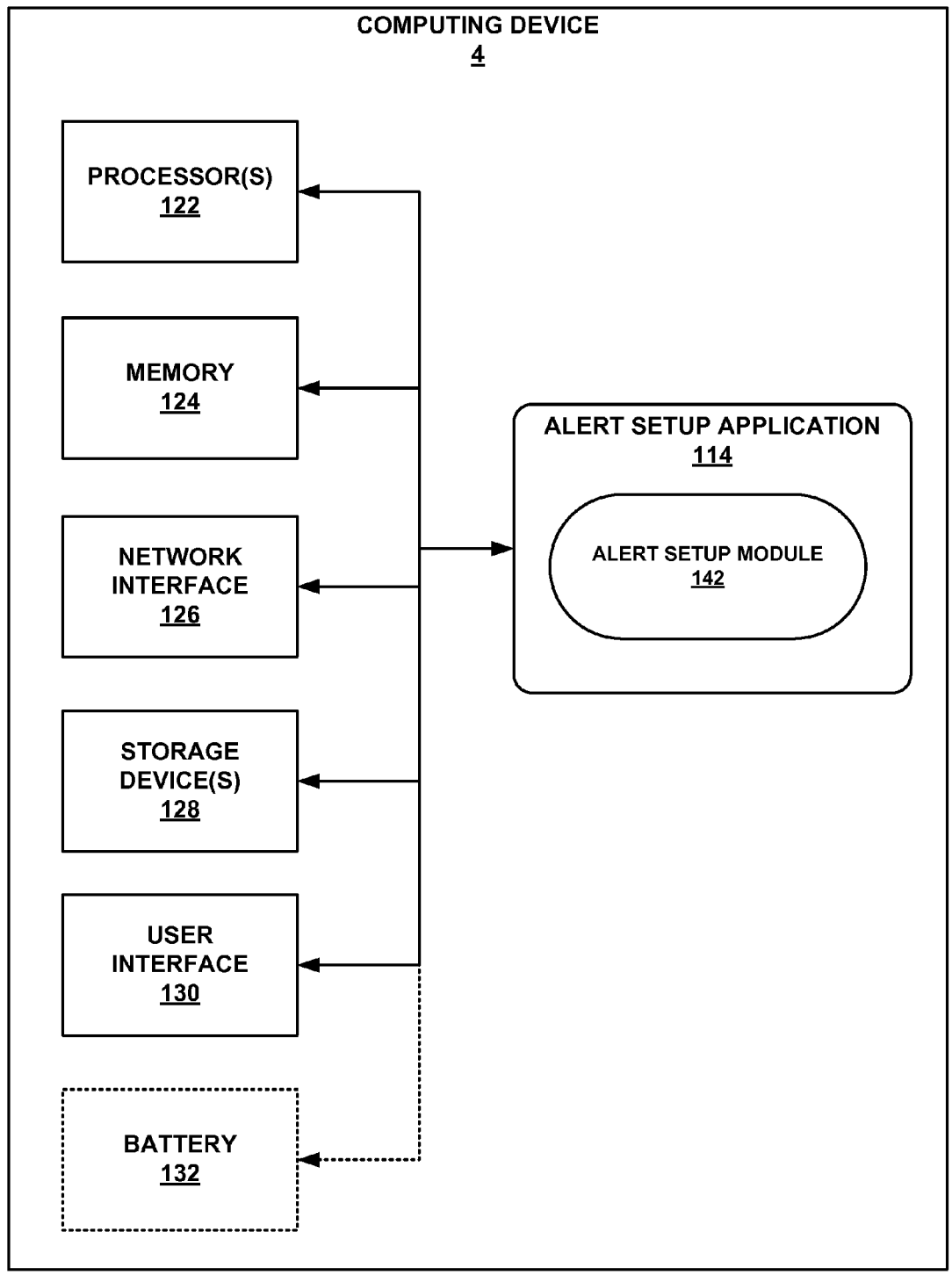
FIG. 2A is a block diagram illustrating further details of one example of the computing device shown in FIG. 1 according to some aspects of the disclosure.

FIG. 2A is a block diagram illustrating further details of computing device 4 shown in FIG. 1. FIG. 2A illustrates only one particular example of computing device 4, and many other example embodiments of computing device 4 may be used in other instances. As shown in the example of FIG. 2A, computing device 4 includes one or more processors 122, memory 124, a network interface 126, one or more storage devices 128, user interface 130, and an optional battery 132. For example, if computing device 4 comprises a mobile device, computing device 4 may include battery 132. Each of components 122, 124, 126, 128, 130, and 132 may be interconnected via one or more buses for inter-component communications. Processors 122 may be configured to implement functionality and/or process instructions for execution within computing device 4. Processors 122 may be capable of processing instructions stored in memory 124 or instructions stored on storage devices 128.

User interface 130 may include, for example, a monitor or other display device for presentation of visual information to a user of computing device 4. User interface 130 may further include one or more input devices to enable a user to input data, such as a manual keyboard, mouse, touchpad, trackpad, etc. In some examples, user interface 130 may comprise a presence-sensitive user interface device such as, for example, a touch screen, which may be used both to receive and process user input and also to display output information. User interface 130 may further include printers or other devices to output information. In various instances in the description contained herein, references made to user interface 130 may refer to portions of user interface 130 (e.g., touch screen) that provide user input functionality. In one example, user interface 130 may be a touch screen that is responsive to tactile input by the user (e.g., by user's finger or stylus pen). User interface 130 may include soft buttons and/or hard buttons, which may be utilized by a user to provide input and/or make selections.

Memory 124 may be configured to store information within computing device 4 during operation. Memory 124 may, in some examples, be described as a computer-readable storage medium. In some examples, memory 124 is a temporary memory, meaning that a primary purpose of memory 124 is not long-term storage. Memory 124 may also be described as a volatile memory, meaning that memory 124 does not maintain stored contents when the computer is turned off. Examples of volatile memories include random access memories (RAM), dynamic random access memories (DRAM), static random access memories (SRAM), and other forms of volatile memories known in the art. In some examples, memory 124 may be used to store program instructions for execution by processors 122. Memory 124 may be used by software or applications running on computing device 4 (e.g., alert setup application 114 shown in FIG. 1) to temporarily store information during program execution.

Storage devices 128 may also include one or more computer-readable storage media. Storage devices 128 may be configured to store larger amounts of information than memory 124. Storage devices 128 may further be configured for long-term storage of information. In some examples, storage devices 128 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 4 also includes network interface 126. Computing device 4 may utilize network interface 126 to communicate with external devices (e.g., one or more servers 8, other computing devices) via one or more networks (e.g., network 10), such as one or more wireless/wired networks. Computing device 4 may utilize network interface 126 in response to execution of one or more applications that require transferring data to and/or from other devices (e.g., other devices, servers, or the like). Computing device 4 may include Wi-Fi or Bluetooth capabilities, for example, which may be configurable to establish communication with alert device 6 (FIG. 1) through network interface 126.

Any applications implemented within or executed by computing device 4 (e.g., alert setup application 114) may be implemented or contained within, operable by, executed by, and/or be operatively coupled to processors 122, memory 124, network interface 126, storage devices 128, and/or user interface 130.

In one example, computing device 4 may include alert setup application 114, which may generate signals corresponding to alerts associated with one or more applications running on computing device 4. Alert setup application 114 may include alert setup module 142, which may generate the appropriate alert and corresponding signal based on settings of one or more applications running on computing device 4. The settings may be the settings of the application (e.g., incoming call, calendar event reminders, or the like) or may be configured by the user (e.g., alerts based on the contact, alerts based on urgency, or the like). For example, alerts for all phone calls may be the same by default, or the user may assign different alerts (e.g., different intensities of alerts or different patterns of alerts) for different contacts. In another example, alerts for upcoming events on a calendar may all be the same by default, or may be configured by the user to vary based on urgency, how soon the event is, an assigned importance of the event, and the like.

In one example, during implementation or execution of alert setup application 114, alert setup module 142 may be operable by processors 122 to determine when computing device 4 is operating in a mode that corresponds to utilizing alerts such that events associated with applications running on computing device 4 may be output using a dedicated alert device (e.g., alert device 6). Alert setup application 114 may receive from an application an indication of an alert. Alert setup application 114 may then generate a signal indicative of the alert, and cause it to be communicated to the alert device through network interface 126. In one example, the same alert may be utilized for all applications, where an alert may indicate to a user that an event associated with an application has occurred. In another example, the alert may vary based on certain characteristics. For example, the alert may vary based on the type of associated application or on the urgency of the event. In one example, the generated signal indicative of the alert may include the type of alert to output by the alert device, where the alert device outputs the alert included in the signal. In another example, the generated signal may be indicative of the event and/or application for which an alert is desired, and the alert device may determine the type of alert to output.

Processor 122 may be operable to execute one or more algorithms including, for example, an alert setup algorithm. In one example, the alert setup algorithm may generate signals indicative of alerts associated with applications running on computing device 4 according to the techniques of this disclosure. In some examples, the algorithm may determine the type of alert for which an indicative signal is to be generated, by determining the type of event for which an alert is to be out to the user. Furthermore, the alert setup algorithm may provide the appropriate generated signal to a communication module (not shown) to transmit the generated alert to the alert device.

Figure 2B:
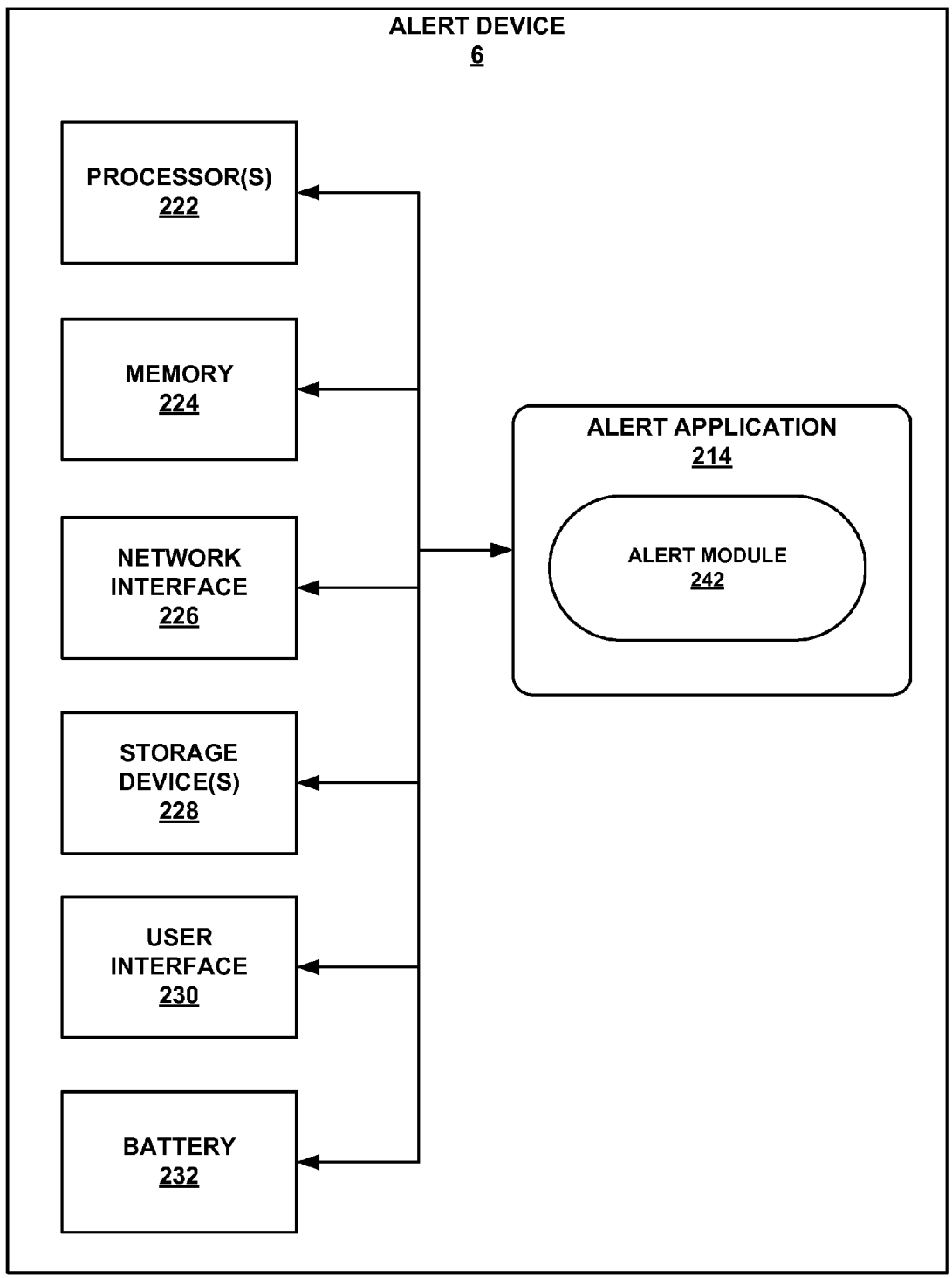
FIG. 2B is a block diagram illustrating further details of one example of the alert device shown in FIG. 1 according to some aspects of the disclosure.

FIG. 2B is a block diagram illustrating further details of one example of the alert device shown in FIG. 1. FIG. 2B illustrates only one particular example of alert device 6, and many other example embodiments of alert device 6 may be used in other instances. As shown in the example of FIG. 2B, alert device 6 includes one or more processors 222, memory 224, a network interface 226, one or more storage devices 228, user interface 230, and battery 232. For example, if alert device 6 comprises a standalone device or may be part of another device, where alert device 6 may be in contact with the user. In one example, where alert device 6 is part of another device, at least some of the components of alert device 6 may be in common with the other device of which alert device 6 is part. Each of components 222, 224, 226, 228, 230, and 232 may be interconnected via one or more buses for inter-component communications. Processors 222 may be configured to implement functionality and/or process instructions for execution within alert device 6. Processors 222 may be capable of processing instructions stored in memory 224 or instructions stored on storage devices 228. Each of components 222, 224, 226, 228, 230, and 232 may be generally similar to components 122, 124, 126, 128, 130, and 132 of computing device 4 of FIG. 2A.

In one example, alert device 6 may include an alert output mechanism (not shown), which may be in contact with the user and may provide mechanic or tactile output corresponding to alerts in accordance with techniques of this disclosure. In some examples, memory 224 may be used to store program instructions for execution by processors 222. Memory 224 may be used by software or applications running on alert device 6 (e.g., alert application 214 shown in FIG. 1) to temporarily store information during program execution.

Alert device 6 also includes network interface 226. Alert device 6 may utilize network interface 226 to communicate with external devices (e.g., computing device 4) via one or more networks (e.g., network 10), such as one or more wireless/wired networks. Alert device 6 may utilize network interface 226 in response to execution of one or more applications that require transferring data to and/or from other devices (e.g., other devices, servers, or the like). Alert device 6 may include Wi-Fi or Bluetooth capabilities, for example, which may be configurable to establish communication with computing device 4 (FIG. 1) through network interface 226.

Any applications implemented within or executed by alert device 6 (e.g., alert application 214) may be implemented or contained within, operable by, executed by, and/or be operatively coupled to processors 222, memory 224, network interface 226, storage devices 228, and/or user interface 230.

In one example, alert device 6 may include alert application 214, which may receive signals corresponding to alerts associated with one or more applications running on computing device 4, and output the appropriate alerts to the user. Alert application 214 may include alert module 242, which may utilize the received signal to generate the appropriate tactile output corresponding to the signal and the alert. In one example, the received signal may indicate the type of output alert, where alert module 242 may control the alert output mechanism based on the alert indicated in the received signal. The indicated alert may be the same for all events and/or applications of computing device 4 or may vary from one application to another and/or one event to another. In another example, the received signal may indicate an event associated with an application or the application for which an alert is needed. In this example, alert module 242 may determine the output alert corresponding to the event and/or application, then control the alert output mechanism accordingly.

Computing device 4 may be associated with alert device 6, as discussed above. In one example, the user may utilize computing device 4 to configure alert device 6, where the configuration may include the events and/or applications associated with computing device 4 and the corresponding alerts. In another example, the user may configure alert settings directly on alert device 6.

In one example, during implementation or execution of alert application 214, alert module 242 may be operable by processors 222 to receive an indication that computing device 4 is operating in a mode that corresponds to utilizing alerts such that events associated with applications running on computing device 4 may be output using alert device 6. In another example, alert device 6 may start receiving alert signals from computing device 4 without first receiving an indication of operating in alert mode.

Alert application 214 may receive from a signal indicative of an alert. Alert application 214 may determine the appropriate tactile output based on the alert and output it by controlling the alert output mechanism. In one example, the same alert may be utilized for all applications, where an alert may indicate to a user that an event associated with an application has occurred. In another example, the alert may vary based on certain characteristics. For example, the alert may vary based on the type of associated application or on the urgency of the event. In one example, the generated signal indicative of the alert may include the type of alert to be output by alert device 6, where alert application 214 causes the alert included in the signal to be output. In another example, the generated signal may be indicative of the event and/or application for which an alert is desired, then alert application 214 may determine the type of alert to output based on the signal.

Processor 222 may execute one or more algorithms including, for example, an alert algorithm. In one example, the alert algorithm may determine an alert based on received signals indicative of alerts associated with applications running on computing device 4 according to the techniques of this disclosure. In some examples, the algorithm may determine the type of alert indicated by the signal received from computing device 4, or may determine the alert based on the type of event for which an alert is to be output to the user based on information about the event and/or application included in the signal.

Figure 3:
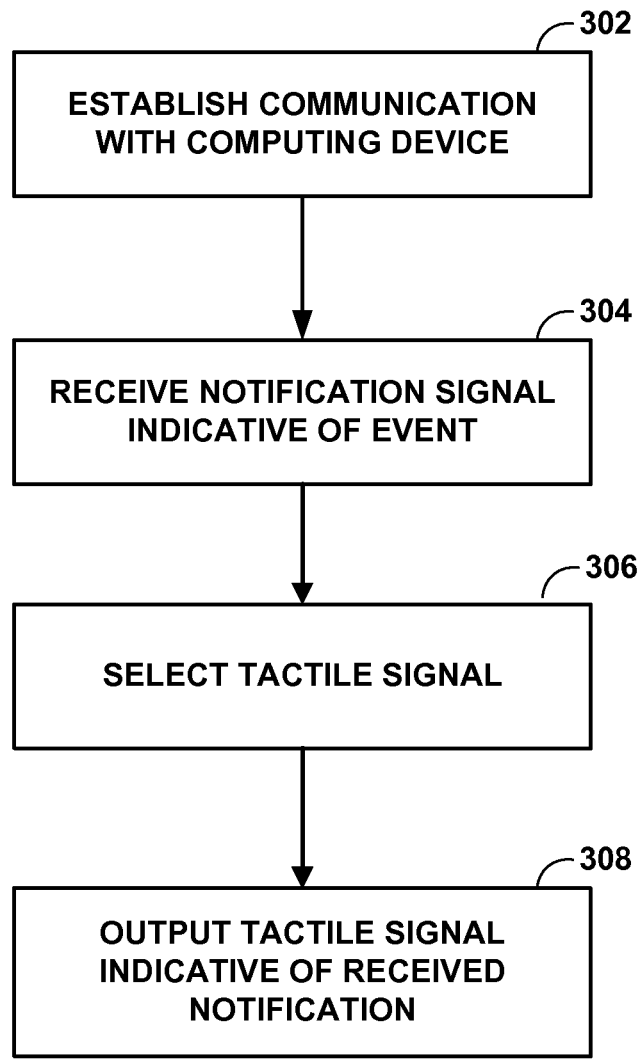
FIG. 3 is a flow diagram illustrating example operation of a computing device in communicating with a destination based on navigation information according to some aspects of the disclosure.

FIG. 3 is a flow diagram illustrating a method that may be performed by an alert device in accordance with one or more aspects of the present disclosure. For example, the illustrated example method may be performed, at least in part, by alert device 6 (FIGS. 1 and 2B). In some examples, a computer-readable storage medium (e.g., a medium included in storage device 228 of FIG. 2B) may be encoded with instructions that, when executed, cause one or more processors (e.g., processor 222) to perform one or more of the acts illustrated in the method of FIGS. 1 and 2B.

The method of FIG. 3 includes establishing, by an alert device (e.g., alert device 6), communication with a computing device (e.g., computing device 4) (302). The establishment of the communication may be the result of the user of the computing device setting up the connection between the computing device and the alert device, such that alerts associated with applications and events running or occurring on the computing device, while in a certain alert mode (e.g., quiet or silent) may be output as a tactile output by the alert device. Therefore, the alert device may be communicatively coupled to the computing device via a communication channel (e.g., communication network 10).

The method may further include wirelessly receiving, by the alert device, a notification signal communicated by the computing device (304). The notification signal may be indicative of an event, from the computing device. In this manner, the control of the alerts output by the alert device are controlled by the user's input at the computing device. The method may further include responsive to receiving the notification signal, selecting, by the alert device, a tactile signal from a plurality of tactile signals based on the notification signal, wherein the tactile signal differs in at least one of intensity and pattern from another tactile signal in the plurality of tactile signals (306). The method may also include outputting the tactile signal indicative of the received notification and detectable by the user of the computing device (308). The tactile signal may be output by a mechanism of the alert device that is controlled by an alert module, where the mechanism may be in contact with the user, such that when the user feels the tactile output that is based on the received notification and therefore the alert, the user is notified with minimal distraction of the associated event and/or application.

In some examples, the computing device may be a mobile phone. In some examples, the alert device may receive the notification signal from a server device, from the Internet, through a local network, or directly from the computing device via peer-to-peer communications. In some examples, selecting the tactile signal may further include determining a type associated with the notification signal, wherein the type depends on one of a plurality of applications associated with the mobile device, and selecting the tactile signal from a plurality of tactile signals based on the determined type.

In some examples, selecting the tactile signal may be based at least in part on a time remaining until the event, or may be based at least in part on a level of importance of the event. In some examples, the event may include the computing device receiving an incoming call, and selecting the tactile signal may be based at least in part on an identity of an originator of the incoming call. In some examples, the event may include the computing device receiving a message, and selecting the tactile signal may be based at least in part on an identity of a sender of the message. In some examples, selecting the tactile signal may further include selecting the tactile signal having a specific intensity level based on the event. In some examples, selecting the tactile signal may further include selecting the tactile signal having a specific pattern based on the event. In some examples, the tactile signal comprises haptic feedback.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
wirelessly receiving, by an alert device, a notification signal communicated by a computing device, wherein:
the notification signal is indicative of an event and a level of urgency associated with the event,
the alert device is external to the computing device, and the alert device is wirelessly and communicatively coupled with the computing device;
determining, by the alert device and based on one of a plurality of applications executable by the computing device, a type associated with the notification signal;
responsive to receiving the notification signal, selecting, by the alert device and based on the level of urgency associated with the event indicated by the notification signal and on the type associated with the notification signal, a tactile signal having at least a specified level of intensity, wherein the tactile signal is selected from a plurality of tactile signals each having a respective level of intensity, and wherein the specified level of intensity of the tactile signal differs from the respective level of intensity of another tactile signal from the plurality of tactile signals; and
outputting, by the alert device, the tactile signal at the specified level of intensity, wherein the tactile signal is detectable by a user of the computing device.

2. The method of claim 1, wherein the computing device comprises a mobile phone.

3. The method of claim 1, wherein the notification signal is wirelessly received from a server device.

4. The method of claim 1, wherein the notification signal is wirelessly received through a local network.

5. The method of claim 1, wherein the notification signal is wirelessly received by the alert device directly from the computing device via peer-to-peer communication.

6. The method of claim 1, wherein the alert device is a stand-alone device.

7. The method of claim 1, wherein the alert device is built into another device.

8. The method of claim 1, wherein selecting the tactile signal is based at least in part on a time remaining until occurrence of the event.

9. The method of claim 1, wherein selecting the tactile signal is based at least in part on a level of importance of the event.

10. The method of claim 1, wherein:
the event is an incoming call being received by the computing device; and
selecting the tactile signal is based at least in part on an identity of an originator of the incoming call.

11. The method of claim 1, wherein:
the event is a receipt of a message by the computing device; and
selecting the tactile signal is based at least in part on an identity of a sender of the message.

12. The method of claim 1, wherein the tactile signal includes a specific signal pattern based on the event.

13. The method of claim 1, wherein the tactile signal comprises haptic feedback.

14. A device comprising:
one or more processors; and
a communication interface operable by the one or more processors to wirelessly receive a notification signal communicated by a computing device, wherein the notification signal is indicative of an event and a level of urgency associated with the event, wherein the device is external to the computing device, and wherein the device is wirelessly and communicatively coupled with the computing device,
wherein the one or more processors are configured to, responsive to receiving the notification signal, determine, based on one of a plurality of applications executable by the computing device, a type associated with the notification signal, and select, based on the level of urgency associated with the event indicated by the notification signal and on the type associated with the notification signal, a tactile signal having at least a specified level of intensity, wherein the tactile signal is selected from a plurality of tactile signals each having a respective level of intensity, and wherein the specified level of intensity of the tactile signal differs from the respective level of intensity of another tactile signal from the plurality of signals, and wherein the one or more professors are further configured to output the tactile signal at the specified level of intensity, wherein the tactile signal is detectable by a user of the computing device.

15. The device of claim 14, wherein the tactile signal is selected by the one or more processors based at least in part on a time remaining until occurrence of the event.

16. The device of claim 14, wherein the tactile signal is selected by the one or more processors based at least in part on a level of importance of the event.

17. The device of claim 14, wherein:
the event is an incoming call being received by the computing device; and
the tactile signal is selected by the one or more processors based at least in part on an identity of an originator of the incoming call.

18. The device of claim 14, wherein:
the event is a receipt of a message by the computing device; and
the tactile signal is selected by the one or more processors based at least in part on an identity of a sender of the message.

19. The device of claim 14, wherein the tactile signal includes a specific signal pattern based on the event.

20. The device of claim 14, wherein the tactile signal comprises haptic feedback.

21. A non-transitory computer-readable storage medium encoded with instructions that, when executed, cause one or more processors to perform operations comprising:
wirelessly receiving a notification signal communicated by a computing device,
wherein the notification signal is indicative of an event and a level of urgency associated with the event,
wherein the device is external to the computing device, and wherein the device is wirelessly and communicatively coupled with the computing device;
determining, based on one of a plurality of applications executable by the computing device, a type associated with the notification signal;
responsive to receiving the notification signal, selecting, based on the level of urgency associated with the event indicated by the notification signal and on the type associated with the notification signal, a tactile signal having at least a specified level of intensity, wherein the tactile signal is selected from a plurality of tactile signals each having a respective level of intensity, and wherein the specified level of intensity of the tactile signal differs from the respective level of intensity of another tactile signal of the plurality of tactile signals; and outputting the tactile signal at the specified level of intensity, wherein the tactile signal is detectable by a user of the computing device.

\* \* \* \* \*